United States Patent
Zeng et al.

(10) Patent No.: US 10,395,144 B2
(45) Date of Patent: Aug. 27, 2019

(54) DEEPLY INTEGRATED FUSION ARCHITECTURE FOR AUTOMATED DRIVING SYSTEMS

(71) Applicant: GM GLOBAL TECHNOLOGY OPERATIONS LLC, Detroit, MI (US)

(72) Inventors: Shuqing Zeng, Sterling Heights, MI (US); Wei Tong, Troy, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 129 days.

(21) Appl. No.: 15/658,138

(22) Filed: Jul. 24, 2017

(65) Prior Publication Data
US 2019/0026597 A1 Jan. 24, 2019

(51) Int. Cl.
*G06K 9/62* (2006.01)
*G05D 1/00* (2006.01)
(Continued)

(52) U.S. Cl.
CPC ........... *G06K 9/629* (2013.01); *G05D 1/0088* (2013.01); *G05D 1/0274* (2013.01); *G05D 1/0278* (2013.01); *G06K 9/00791* (2013.01); *G06K 9/00805* (2013.01); *G06K 9/6256* (2013.01); *G06K 9/6277* (2013.01); *G06N 3/04* (2013.01); *G06N 3/08* (2013.01); *H04L 67/12* (2013.01); *G05D 1/0231* (2013.01); *G05D 2201/0213* (2013.01)

(58) Field of Classification Search
CPC ........... G06K 9/00785; G06K 9/00825; G06K 9/6256; G06K 9/00791; G06K 9/00798; G06K 9/629; G05D 1/0088; G05D 1/0248; G05D 1/0274; G05D 1/0278; G05D 2201/0213; G06T 2207/20081; G06T 2207/20084; G06T 2207/30256; G06N 3/04; G06N 3/08; G06N 3/084; H04L 67/12
See application file for complete search history.

(56) References Cited

U.S. PATENT DOCUMENTS 9,286,524 B1 * 3/2016 Mei .................. G06K 9/6273
9,760,806 B1 * 9/2017 Ning .................. B60W 50/14
(Continued)

OTHER PUBLICATIONS

Enzweiler et al. Efficient Stixel-Based Object Recognition, Jun. 2012, IEEE Intelligent Vehicles Symposium.*

*Primary Examiner* — Jingge Wu
(74) *Attorney, Agent, or Firm* — Lorenz & Kopf LLP

(57) ABSTRACT

Methods and apparatus are provided for controlling an autonomous vehicle. A sensor fusion system with a sensor system for providing environment condition information and a convolutional neural network (CNN) is provided. The CNN includes a receiving interface configured to receive the environment condition information from the sensor system, a common convolutional layer configured to extract traffic information from the received environment condition information, and a plurality of fully connected layers configured to detect objects belonging to different object classes based on the extracted traffic information, wherein the object classes include at least one of a road feature class, a static object class, and a dynamic object class.

10 Claims, 6 Drawing Sheets

(51) Int. Cl.
  *G05D 1/02*    (2006.01)
  *G06K 9/00*    (2006.01)
  *G06N 3/04*    (2006.01)
  *G06N 3/08*    (2006.01)
  *H04L 29/08*   (2006.01)

(56) References Cited

U.S. PATENT DOCUMENTS

| | | | | |
|---|---|---|---|---|
| 10,106,153 | B1* | 10/2018 | Xiao | G06K 9/00805 |
| 2006/0271269 | A1* | 11/2006 | Stolle | G05B 13/027 |
| | | | | 701/106 |
| 2015/0324659 | A1* | 11/2015 | Liu | G06T 7/593 |
| | | | | 382/197 |
| 2016/0180195 | A1* | 6/2016 | Martinson | G06K 9/6256 |
| | | | | 382/103 |
| 2016/0247290 | A1* | 8/2016 | Liu | G06K 9/4604 |
| 2017/0113664 | A1* | 4/2017 | Nix | B60T 7/12 |
| 2017/0293837 | A1* | 10/2017 | Cosatto | G06K 9/00201 |
| 2018/0136660 | A1* | 5/2018 | Mudalige | G05D 1/021 |
| 2018/0211117 | A1* | 7/2018 | Ratti | G06K 9/3233 |
| 2018/0211128 | A1* | 7/2018 | Hotson | G06K 9/4604 |
| 2018/0211130 | A1* | 7/2018 | Jiang | G06K 9/4628 |
| 2018/0211403 | A1* | 7/2018 | Hotson | G06K 9/4604 |
| 2018/0232585 | A1* | 8/2018 | Kim | G06K 9/00825 |
| 2018/0253647 | A1* | 9/2018 | Yu | G06N 3/082 |
| 2018/0259970 | A1* | 9/2018 | Wang | G05D 1/0231 |
| 2018/0285664 | A1* | 10/2018 | Satyakumar | G06K 9/00825 |

\* cited by examiner

DEEPLY INTEGRATED FUSION ARCHITECTURE FOR AUTOMATED DRIVING SYSTEMS

TECHNICAL FIELD

The technical field generally relates to autonomous vehicles, and more particularly relates to systems and methods for providing autonomous driving system functions, and yet more particularly relates to a sensor fusion system for an autonomous driving system, to a vehicle with such a sensor fusion system, and to a method for fusing sensor data of an autonomous vehicle.

INTRODUCTION

An autonomous vehicle is a vehicle that is capable of sensing its environment and navigating with little or no user input. An autonomous vehicle senses its environment using one or more sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

The computation and extraction of traffic-relevant data in an autonomous vehicle often takes place in a sensor fusion system. The sensor fusion system typically receives sensor data, fuses and processes this sensor data, and provides the processed data to higher automation functions in order to enable autonomous or semi-autonomous data. In many cases, the sensors operate in multiple modalities—e.g., one sensor may produce optical data, while another might produce lidar point-cloud data and/or radar data to be fused to produce a coherent understanding of the vehicle's environment.

Accordingly, it is desirable to enable an efficient data fusion from multi-modality sensors. In addition, it is desirable to enable a combining of multiple functionally specific trained networks into a single network with broader functional capability to reduce training time and computational power. Furthermore, other desirable features and characteristics of the present invention will become apparent from the subsequent detailed description and the appended claims, taken in conjunction with the accompanying drawings and the foregoing technical field and background.

SUMMARY

A sensor fusion system for an autonomous driving system is provided. The sensor fusion system includes a sensor system for providing environment condition information and a convolutional neural network (CNN). The convolutional neural network comprises a receiving interface configured to receive the environment condition information from the sensor system, a common convolutional layer configured to extract traffic information from the received environment condition information, and a plurality of fully connected layers configured to detect objects belonging to different object classes based on the extracted traffic information, wherein the object classes include at least one of a road feature class, a static object class, and a dynamic object class.

In various embodiments, the common convolutional layer combines functions of a plurality of functionally specific trained neural networks.

In various embodiments, the receiving interface comprises a cogent camera API, wherein the cogent camera API is adapted to receive information relating to a vision pipeline.

In various embodiments, the common convolutional layer is configured to generate a visual feature map based on the extracted traffic information.

In various embodiments, the receiving interface comprises a sensor API, wherein the sensor API is adapted to receive information relating to range data assigned to objects in the traffic information.

In various embodiments, the sensor fusion system further comprises a range data processing unit, wherein the range data processing unit is adapted to receive information from the sensor API.

In various embodiments, the range data processing unit is configured to generate a range data map based on the received range data.

In various embodiments, the common convolutional layer and the range data processing unit share a same semantic classification and, wherein the range data processing unit is configured to transmit information to the common convolutional layer and/or vice versa.

In various embodiments, the range data processing unit and the common convolutional layer are configured to be trained for exclusive and/or mutual feature identification.

In various embodiments, the plurality of fully connected layers is configured to receive data from the common convolutional layer and from the range data processing unit, which data relate to a learned visual feature map and/or a range data map, respectively. Each one of the plurality of fully connected layers is configured to identify objects belonging to one of different object classes, respectively.

In various embodiments, the sensor fusion system further comprises at least one environment representation layer, wherein the at least one environment representation layer is adapted to receive information from the fully connected layers.

In various embodiments, the sensor fusion system, further comprises at least one object-level fusion layer, wherein the at least one object-level fusion layer is adapted to receive information from the fully connected layers and/or from the at least one environment representation layer.

A vehicle is provided that includes the sensor fusion system described herein in accordance with one or more of the described embodiments.

A method for fusing sensor data of an autonomous driving system is provided. In one embodiment, the method includes the steps: receiving environment condition information, extracting traffic information from the received environment condition information by a common convolutional layer, detecting objects belonging to different object classes from the extracted traffic information, wherein the object classes include at least one of a road feature class, a static object class, and a dynamic object class.

It is noted that, in various embodiments, the method is modified in accordance with the functions of one or more of the embodiments of the sensor fusion system described herein.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
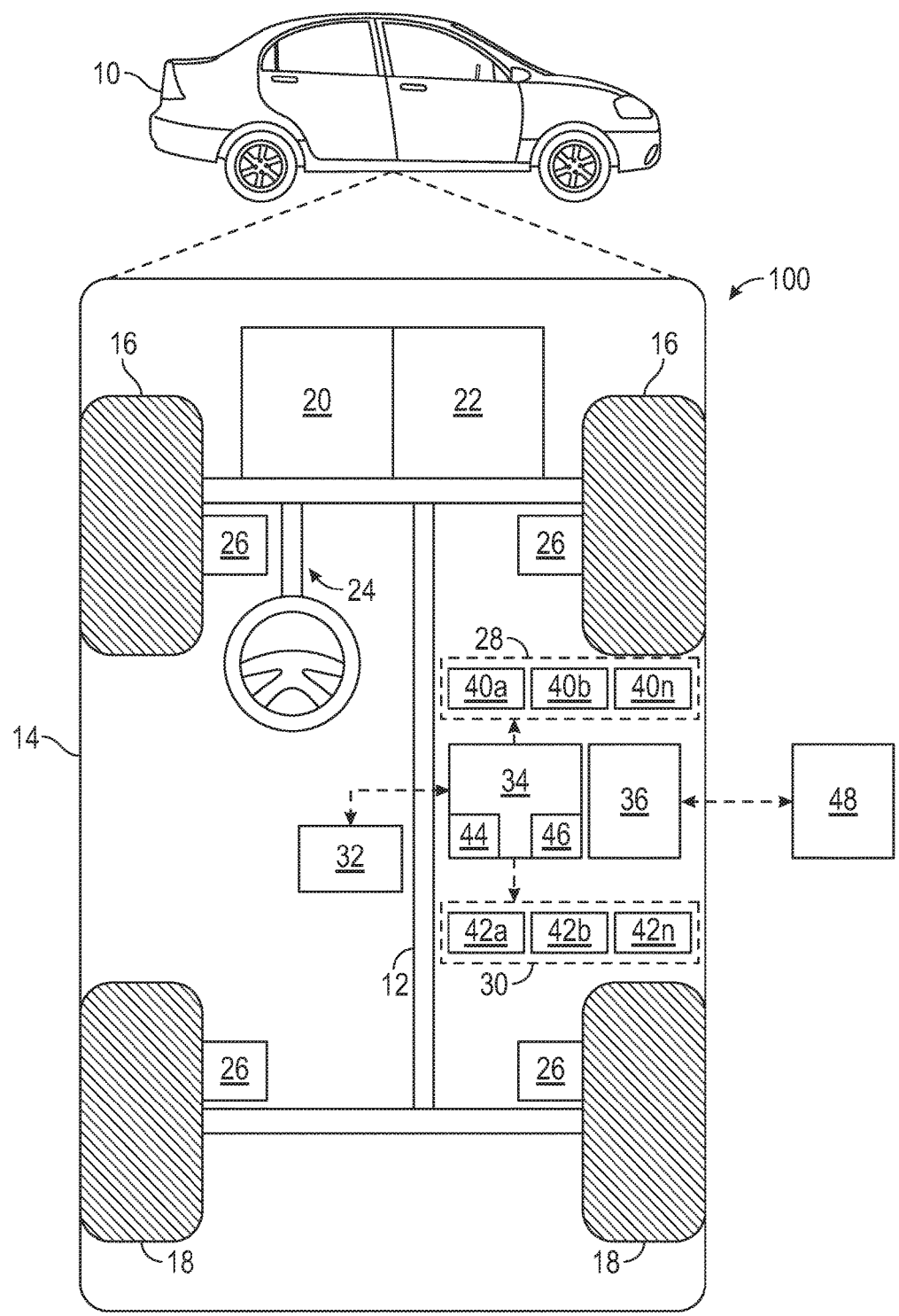
FIG. 1 is a functional block diagram illustrating an autonomous vehicle having a controller, in accordance with an embodiment.

With reference to FIG. 1, a vehicle 10 is shown in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
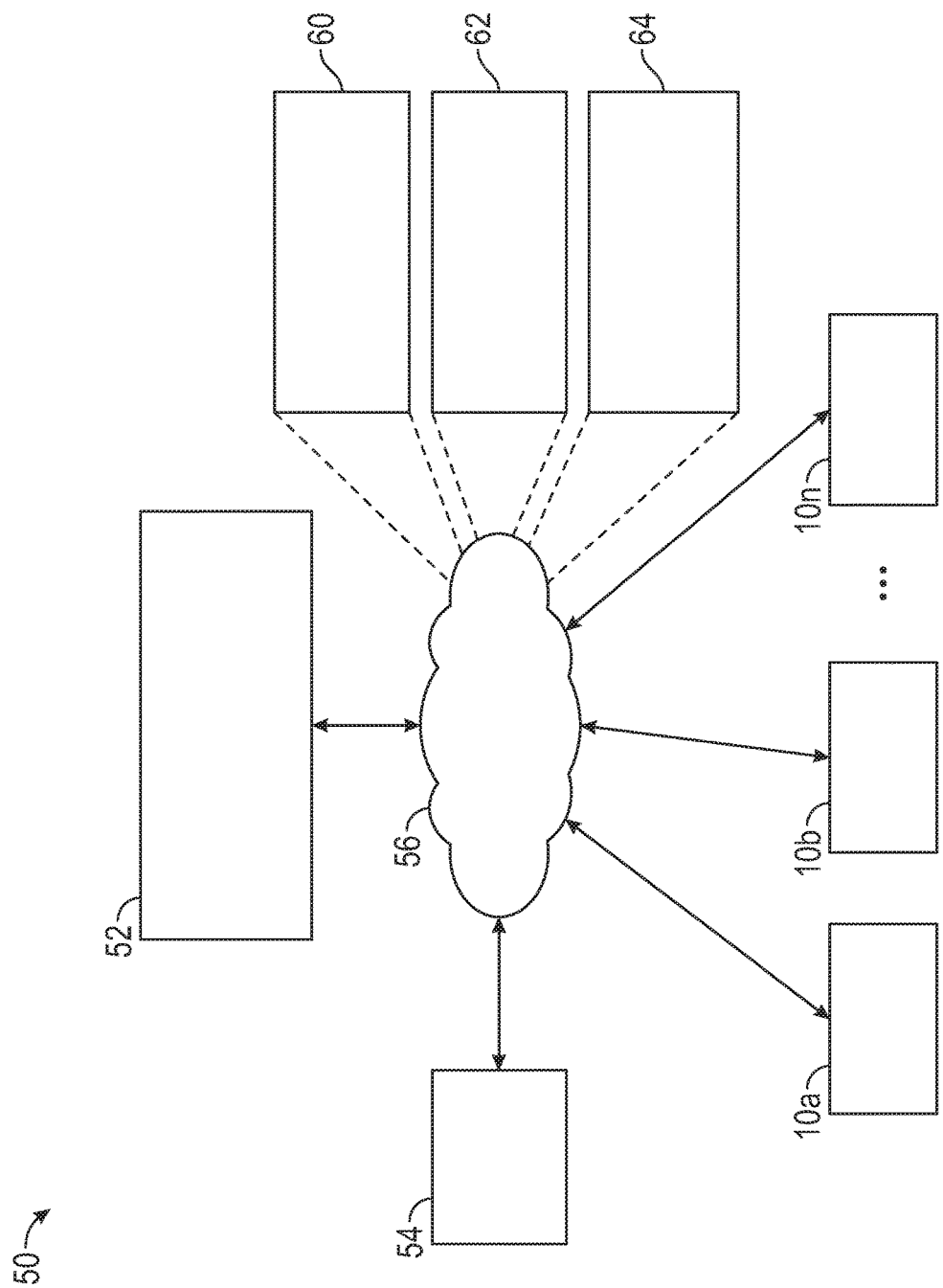
FIG. 2 is a functional block diagram illustrating a transportation system having one or more autonomous vehicles of FIG. 1, in accordance with an embodiment.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 34, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied to provide autonomous driving system functions as described with reference to one or more of the embodiments herein. The controller 34 or one of its functional modules is configured to implement the functions described with reference to one or a combination of embodiments of the sensor fusion system.

In various embodiments, the sensor fusion system includes the sensor system 28 (FIG. 1) and the controller 34. In various embodiments, the controller 34 is configured to implement a convolutional neural network (CNN) and its functions described herein. The sensor fusion system comprises a receiving interface configured to receive environment condition information, a common convolutional layer (in particular, a single convolutional layer) configured to extract traffic information from the received environment condition information from sensor system 28, and a plurality of fully connected layers configured to detect objects belonging to different object classes based on the extracted traffic information, wherein the object classes include at least one of a road feature class (contains road features or road parameters), a static object class, and a dynamic object class.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56. The communication system 36 is configured to receive traffic information from an external entity or system and to provide the traffic information to the controller 34, in particular to the guidance system 78.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
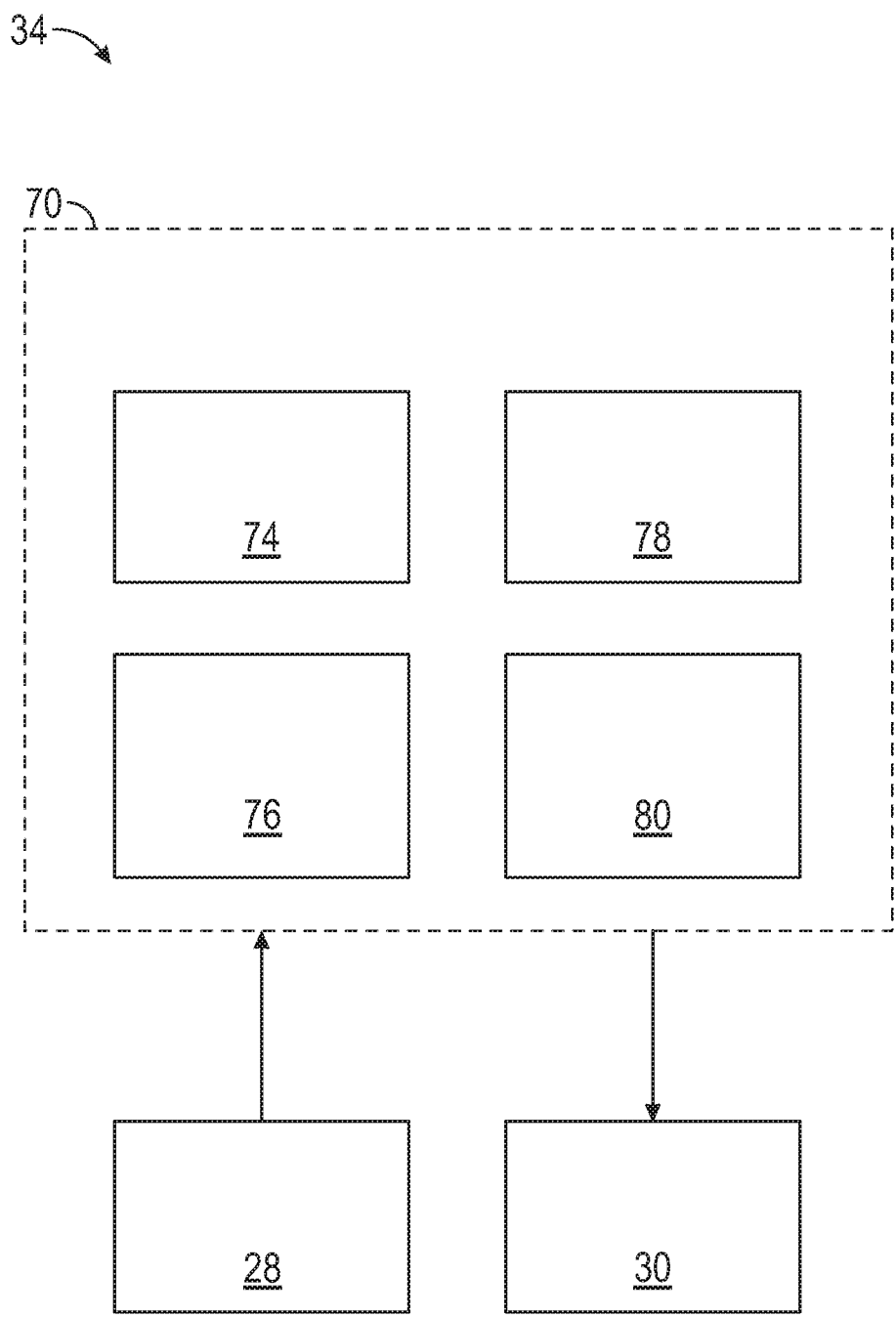
FIG. 3 is a functional block diagram illustrating a controller, in accordance with an embodiment.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10. In various embodiments, the sensor fusion system 74 described herein and its functions are part of the ADS 70 and implement at least a part of the functions of the ADS 70.

In various embodiments, the instructions of the autonomous driving system 70 are organized by function or system. For example, as shown in FIG. 3, the autonomous driving system 70 can include a sensor fusion system 74 as described herein, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors. The sensor fusion system 74 fuses input from several sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
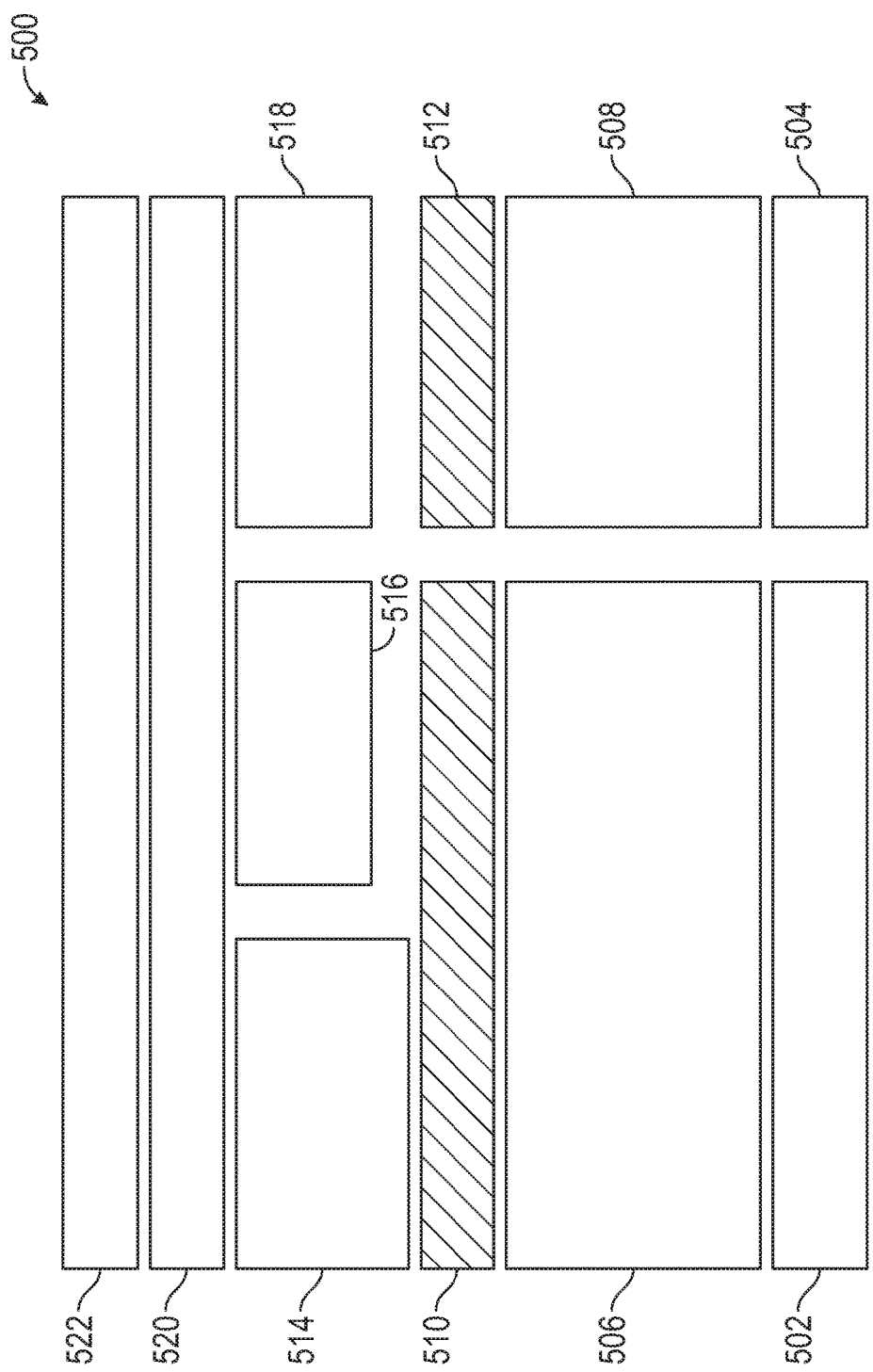
FIG. 4 is a schematic representation of a functional block diagram of a sensor fusion system in accordance with an embodiment.

With reference now to FIG. 4, a multi-layer sensor fusion system 500 is shown which may be included in the sensor fusion system 74 of FIG. 3 in accordance with various embodiments. As shown, the multi-layer sensor fusion system 500 includes an interface layer, a convolutional layer, a range data layer, a map layer, a fully connected layer, an environment layer, and a fusion layer.

In various embodiments, the interface layer includes a receiving interface configured to provide a cogent camera application programming interface (API) 502 and a sensor API 504. The cogent camera API 502 and the sensor API 504 may be referred to as receiving interface in accordance with various embodiments. The cogent camera API 502 receives image data (e.g., two-dimensional arrays of integer or floating point values) from a camera (or other imaging devices) and processes that image data via the convolutional layer 506 as described in further detail below. The sensor API 504 receives environment condition information from other sensor devices, such as lidar and/or radar, and forwards the environment condition information to the range data processing layer 508.

In various embodiments, the range data layer includes a range data processing unit 508 that receives the information from the sensor API and generates a range data map 512. The range data map 512 includes a map of depths or distances associated with features identified from the environment.

In various embodiments, the convolutional layer includes a common convolutional layer 506 that extracts visual features from the image data such as traffic information and generates a learned visual feature map 510. The common convolutional layer 506 extracts the visual features using a trained convolutional neural network (CNN). In various embodiments, the common convolutional layer 506 and the range data processing unit 508 share a same semantic classification, wherein the range data processing unit 508 is configured to transmit information to the common convolutional layer 506 and/or vice versa.

In various embodiments, the fully connected layer includes a plurality of fully connected layers 514, 516 and 518 that are configured to detect objects by class. In various embodiments, the classes include object/freespace 514, road feature 516, and stixel 518. The fully connected layers detect the objects based on fully connected neural networks and the visual feature map 510 and the range data map 512.

With continued reference to FIG. 4, layers 506, 508, 510, 512, 514, 516, and 518 effectively implement a CNN that receives one or more input images from cogent camera API 502 (e.g., an optical image of the environment from sensors 28) as well as sensor data from sensor API 504 (e.g., lidar, radar, and other such data) and produces a series of outputs (from layers 514, 516, 518) associated with whether and to what extent known road features, objects, and freespace are present within those images. In that regard, the output of cogent camera API 502 may be referred to herein without loss of generality as an "image," even though it might include a variety of sensor data types and/or a sequence of images.

In general, the convolutional layers 506 implement a convolutional phase that operates on the image received from cogent camera API 502, followed by feature extraction and classification to produce a first level of feature map (not illustrated). More particularly, the convolutional phase of convolutional layer 506 uses an appropriately sized convolutional filter that produces a set of feature maps corresponding to smaller tilings of the input image received from cogent camera API 502. As is known, convolution as a process is translationally invariant—i.e., features of interest (e.g., road features, objects in the field of view of AV 10, and freespace) can be identified regardless of their location within the image.

Subsampling is then performed to produce a second set of smaller feature maps that are effectively "smoothed" to reduce sensitivity of the convolutional filters to noise and other variations. These feature maps may then undergo another convolution, as is known in the art, to produce a large set of smaller feature maps which are then subsampled to produce the learned visual feature map layer 510.

During a classification phase, the feature maps of visual feature map layer 510 are processed via fully-connected connected layers 514 and 516, the output of which is utilized by environment representation layer 520 as well as the output of the "stixel" fully connected layers 518. The output of range data map 512 is similarly processed by a fully connected layer 518.

In general, the CNN illustrated in FIG. 4 may be trained in a supervised mode by presenting it with a large number (i.e., a "corpus") of labeled input images (e.g., of known road features, objects, and free space of the type likely to be encountered by cogent camera API 502), followed by a backpropagation process to refine the training of the CNN. The resulting machine learning model is then implemented within one or more components of AV 10. Subsequently, during normal operation, the trained CNN is used to process sensor data received by cogent camera API 502 and sensor API 504 as vehicle 10 moves through its environment and encounters road features, objects, and free space.

It will be appreciated that the present embodiments are not limited to the CNN model described above. A variety of machine learning techniques may be used, including, for example, recurrent neural networks (RNN), random forest classifiers, Bayes classifiers (e.g., naive Bayes), principal component analysis (PCA), support vector machines, linear discriminant analysis, and the like.

In various embodiments, the environment layer includes an environment representation layer 520 that receives information from the plurality of fully connected layers 514, 516 and 518.

In various embodiments, the fusion layer includes at least one object-level fusion layer 522 that receives information from the fully connected layers 514, 516 and 518 and/or from the environment representation layer 520. The at least one object-level fusion layer is configured to: track a detected object by fusing information from the range data and the at least one environment representation layer and to provide estimates for the position and velocity of the object;

perform fusion in a free-space representation using range data and camera detected free space and output a fused free-space output; and perform fusion in stixel representation using range data and camera data and output fused stixels.

The multi-layer system of FIG. 4 is thus advantageous in that a single convolutional layer 506 is used to produce a common learned visual feature map 510, rather three separately trained convolutional layers (i.e., one each for detecting freespace, objects, and traffic features). The system of FIG. 4 (via environment representation layers 520) thus effectively detects features in the environment and classifies the detected objects probabilistically—assigning a probability to each.

For example, a strong pedestrian classification probability for an object excludes the likeliness of that object being a vehicle or free space, and vice versa. In various embodiments, there is a tight integration of range data, as the range data processing unit 508 and the single common convolutional layer 506 share the same semantic classification and skills learned from the range data processing (by range processing unit 508) and can be transferred to vision processing (by the common convolutional layer 506).

Figure 5:
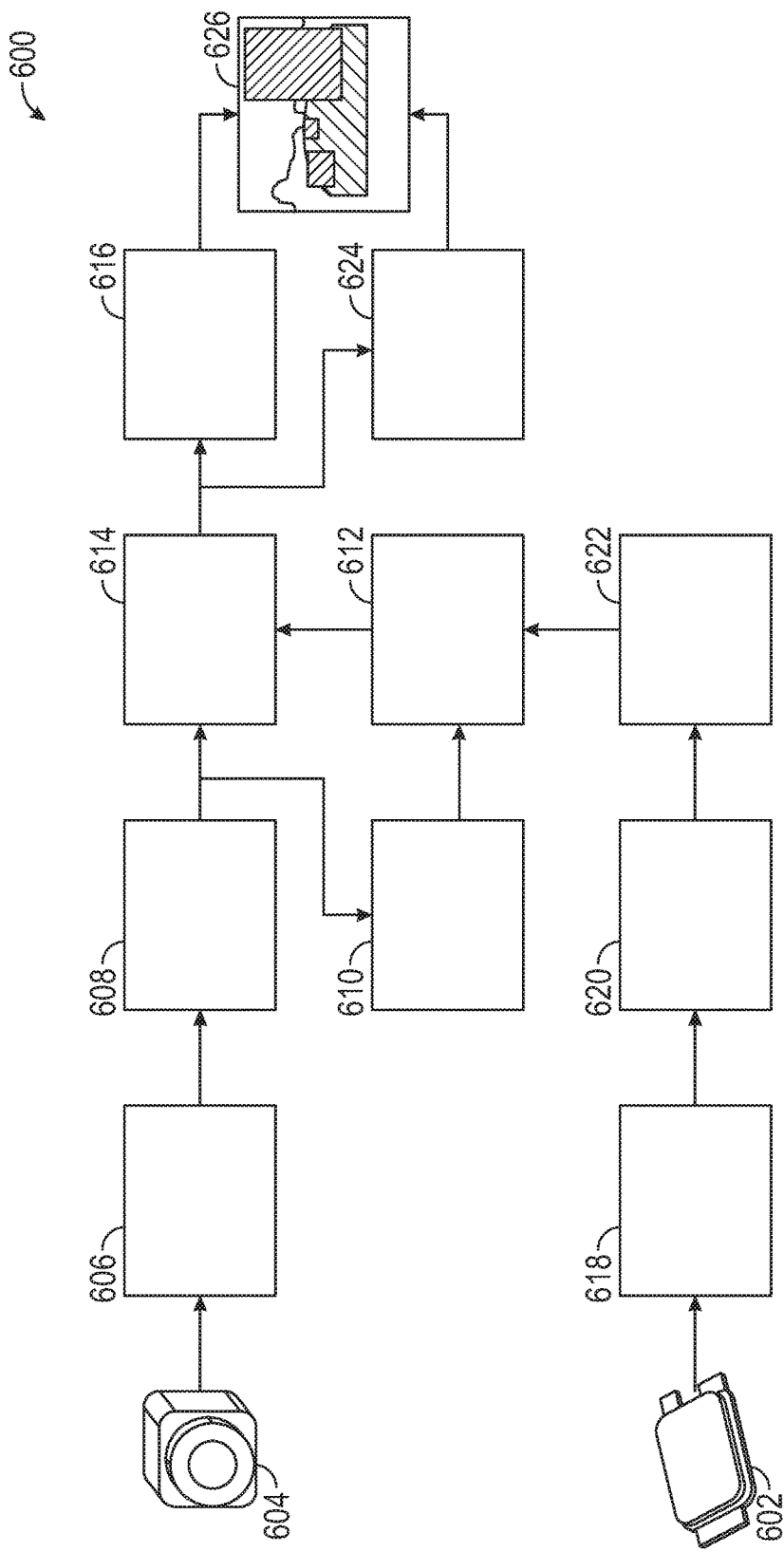
FIG. 5 is a schematic representation of a flowchart of fusing sensor data in accordance with an embodiment.

With reference now to FIG. 5, a flowchart/functional block diagram 600 is shown which schematically indicates the data flow from a range of sensors (e.g. within sensor system 28) to the generated output 622. In the illustrated embodiment, one or more range sensors 602 and one or more visual sensors, such as cameras 604, provide environment data as discussed above. A point cloud (e.g., a lidar point cloud) is projected to the image plane of camera(s) 604 by the range data processing unit 508 (FIG. 4) in processing step 618 and a range map is created subsequently in step 620, to which a region proposal algorithm is applied in step 622.

Functions 618, 620, and 622 are part of a range-processing pipeline while the processing data from the camera 604 belong to a vision processing pipeline. Camera 604 provides data to the convolutional layers (506 in FIG. 4) and the convolutional layers process the data in step 606 so that a feature map (510 in FIG. 4) is generated at 608. A region proposal net is determined in step 610 based on the feature map. In a subsequent step 612, the region proposal net from the vision pipeline and the region proposal algorithm from the range pipeline are fused to achieve a region of interest (ROI) net in step 612 which is again fused with the visual data in a ROI pooling layer in step 614. Based on the data from functional module or step 614, a classification net 616 and a localization net (bound box or stixel regression) 624 are created and are the basis for the combined visual and range map 626.

Figure 6:
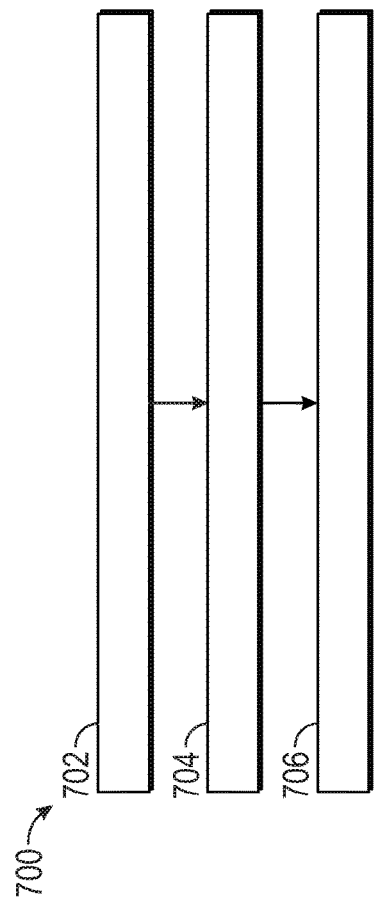
FIG. 6 is a schematic representation of the steps of a method in accordance with an embodiment.

With reference now to FIG. 6, a flowchart 700 of an exemplary method for fusing sensor data of an autonomous driving system in accordance with various embodiments is shown. In a first step 702, environment condition information is received via a receiving interface. In a second step 704, traffic information is extracted from the received environment condition information. In a third step 706, objects belonging to different object classes based on the extracted traffic information are detected, wherein the object classes include at least one of a road feature class, a static object class, and a dynamic object class.

Figure 7:
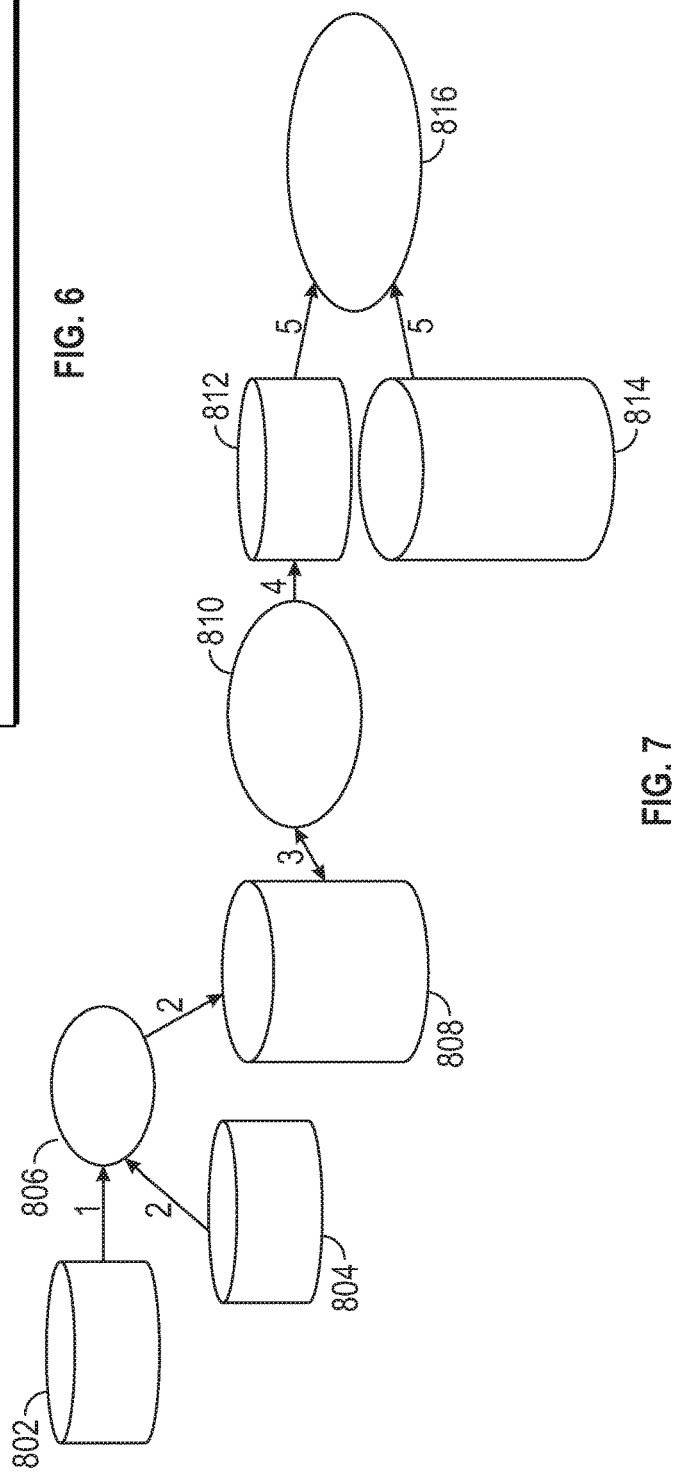
FIG. 7 is a schematic representation of a training process of the sensor fusion system in accordance with various embodiments.

With reference to FIG. 7, a training process of the sensor fusion system described with reference to FIG. 4 is shown. A vehicle training database 802 and a pedestrian training database 804 are provided and a vehicle detector 806 is generated based on databases 802, 804 so as to obtain a unified vehicle and pedestrian training database 808 together with a vehicle and pedestrian detector 810. Based on a "hard" training database 812 and a small set of databases with vehicle and pedestrian labelled 814, a refined vehicle and pedestrian detector 816 is obtained.

In a first step, vehicle detector 806 is trained using vehicle training database 802. Subsequently, in a second step, negative samples in the pedestrian training database 804 are classified and double negatives in the pedestrian training database 804 are selected as negative and positive samples pedestrian training database as the unified database 808. Subsequently, the vehicle and pedestrian detector 810 is trained using the unified database 808 and the vehicle training database 802 is added to the unified database 808 with all negative samples reclassified, and the vehicle and pedestrian detector 810 is re-trained. In various embodiments, the step of adding the vehicle training database 802 to the unified database 808 with all negative samples reclassified, and re-training the vehicle and pedestrian detector 810 is iterated a few times. The "hard" training database 812 contains samples with large error and database 812 is chosen for refining the vehicle and pedestrian detector together with the joint labelled data set from database 814. Thus, early learned skills can be transferred to the next phase of learning and the desired features are progressively developed. This approach describes an evolutionary process in which new object classes and objects are learned iteratively over time.

In summary, the systems and the methods described herein provide deeply-integrated fusion to optimize vision pipeline processing in automated driving perception systems by transferring learned information from subsystems and commonizing computing layers. In various embodiments, this results in an end-to-end learning algorithm that enables efficient data fusion from multi-modality sensors. Feature maps learned from pedestrian and/or vehicle detection benefit from the road feature learning and stixel creation. Skills learned from range data processing can be transferred to vision processing, and vice versa. The system and method described herein enables combining multiple functionally specific trained neural networks into a single network with broader functional capability to reduce training time of the networks and computational power. Combined feature training resolves conflicts in each location, as there is only one common convolutional layer. Range data are tightly integrated to reduce overall network computing latency and computational redundancy of the convolutional layers in deep learning algorithms is removed.

In various embodiments, the deep learning based fusion algorithm (the architecture of the sensor fusion system described herein) constructs a hybrid representation (bounding boxes, segmentation, stixels) by combining dense earth observation (EO) image and sparse range map and many already trained networks are combined into a single network.

In various embodiments, the sensor fusion system described herein discovers features and representations through end-to-end training. Range map and visual feature map are used as the input for fully connected layers and for detecting and localizing objects in the images in order to classify object's semantic classes (e.g., pedestrian, vehicle, etc.). A joint training is done to detect objects, free space, lanes, road level features, and stixels for general obstacles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A sensor fusion system for an autonomous driving system, comprising:
   a sensor system for providing environment condition information;
   a camera for providing camera data;
   a range data processing unit configured to receive the environment condition information and produce a range data map; and
   a convolutional neural network comprising:
   a receiving interface configured to receive the environment condition information, from the sensor system and to receive the camera data from the camera,
   a common convolutional layer configured to, by a processor, extract traffic information from the camera data based on the range data map and to produce a plurality of feature maps associated with the traffic information,
   a plurality of fully connected layers configured to, by a processor, detect objects belonging to different object classes based on the extracted traffic information and the range data map, wherein the object classes include at least one of a road feature class, a static object class, and a dynamic object class;
   an environment representation layer configured to, by a processor, provide environment information; and
   an object-level fusion layer is configured to, by a processor, track the detected objects by fusing information from the range data map and data from the environment representation layer and to provide estimates for the position and velocity of the tracked objects, perform fusion in a free-space representation using the range data map and the plurality of feature maps to produce a fused free-space output, and perform fusion in stixel representation using the range data map and camera data the plurality of feature maps to produce fused stixels.

2. The system of claim 1, wherein the common convolutional layer combines functions of a plurality of functionally specific trained neural networks.

3. The system of claim 1, wherein the receiving interface comprises a cogent camera API configured to receive information relating to a vision pipeline, and/or wherein the receiving interface comprises a sensor API, wherein the sensor API is adapted to receive information relating to range data assigned to objects in the traffic information.

4. The system of claim 1, wherein the common convolutional layer and the range data processing unit share a same semantic classification and, wherein the range data processing unit is configured to transmit information to the common convolutional layer and/or vice versa.

5. The system of claim 4, wherein the range data processing unit and the common convolutional layer are configured to be trained for exclusive and/or mutual feature identification.

6. An autonomous vehicle, comprising a sensor fusion system, the sensor fusion system having a convolutional neural network comprising:
   a receiving interface configured to receive environment condition information from at least one of a lidar and a radar, and to receive camera data from a camera, a common convolutional layer configured to extract traffic information from the camera data based on the range data map and to produce a plurality of feature maps associated with the traffic information,
   a plurality of fully connected layers configured to, by a processor, detect objects belonging to different object classes based on the extracted traffic information and the range data map, wherein the object classes include at least one of a road feature class, a static object class, and a dynamic object class;
   an environment representation layer configured to, by a processor, provide environment information; and
   an object-level fusion layer is configured to, by a processor, track the detected objects by fusing information from the range data map and data from the environment representation layer and to provide estimates for the position and velocity of the tracked objects, perform fusion in a free-space representation using the range data map and the plurality of feature maps to produce a fused free-space output, and perform fusion in stixel representation using the range data map and camera data the plurality of feature maps to produce fused stixels.

7. The autonomous vehicle of claim 6, wherein the common convolutional layer combines functions of a plurality of functionally specific trained neural networks.

8. The autonomous vehicle of claim 6,
   wherein the receiving interface comprises a sensor API,
   wherein the sensor API is adapted to receive information relating to range data assigned to objects in the traffic information,
   wherein the system further comprises a range data processing unit,
   wherein the range data processing unit is adapted to receive information from the sensor API,
   wherein the range data processing unit is configured to generate a range data map based on the received range data.

9. The autonomous vehicle of claim 6,
   wherein the common convolutional layer and the range data processing unit share a same semantic classification and,
   wherein the range data processing unit is configured to transmit information to the common convolutional layer and/or vice versa,
   wherein the range data processing unit and the common convolutional layer are configured to be trained for exclusive and/or mutual feature identification.

10. The autonomous vehicle of claim 9,
    wherein the plurality of fully connected layers is configured to receive data from the common convolutional layer and from the range data processing unit, which data relate to a learned visual feature map and/or a range data map, respectively,
    wherein each one of the plurality of fully connected layers is configured to identify objects belonging to one of different object classes, respectively.

* * * * *